US008658554B2

(12) United States Patent
Dorner et al.

(10) Patent No.: US 8,658,554 B2
(45) Date of Patent: Feb. 25, 2014

(54) CATALYTIC SUPPORT FOR USE IN CARBON DIOXIDE HYDROGENATION REACTIONS

(75) Inventors: Robert W. Dorner, Naperville, IL (US); Heather D. Willauer, Fairfax Station, VA (US); Dennis R Hardy, California, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 238 days.

(21) Appl. No.: 12/914,237

(22) Filed: Oct. 28, 2010

(65) Prior Publication Data

US 2011/0105630 A1 May 5, 2011

Related U.S. Application Data

(60) Provisional application No. 61/257,909, filed on Nov. 4, 2009.

(51) Int. Cl.

| B01J 21/18 | (2006.01) |
|---|---|
| B01J 23/00 | (2006.01) |
| B01J 23/02 | (2006.01) |
| B01J 23/08 | (2006.01) |
| B01J 23/10 | (2006.01) |
| B01J 23/32 | (2006.01) |
| B01J 23/40 | (2006.01) |
| B01J 23/74 | (2006.01) |
| B01D 53/04 | (2006.01) |
| B01D 53/56 | (2006.01) |
| C01B 3/12 | (2006.01) |
| C01B 3/16 | (2006.01) |
| C01B 3/18 | (2006.01) |
| C01B 17/16 | (2006.01) |
| C01B 31/20 | (2006.01) |
| C07C 1/00 | (2006.01) |

(52) U.S. Cl.
USPC ........... 502/180; 502/182; 502/184; 502/185; 502/302; 502/303; 502/304; 502/305; 502/324; 502/325; 502/344; 502/349; 502/355; 423/230; 423/437.1; 423/655; 423/656; 518/719; 518/721; 518/726; 585/603; 585/638; 585/723

(58) Field of Classification Search
USPC ......... 502/180, 182, 184, 185, 302–305, 324, 502/325, 344, 349, 355; 423/230, 437.1, 423/655, 656; 518/719, 721, 726; 585/603, 585/638, 733
See application file for complete search history.

(56) References Cited

U.S. PATENT DOCUMENTS 2,486,895 A * 11/1949 Watson .......................... 518/711
2,637,739 A * 5/1953 McGrath ........................ 518/715
(Continued)

FOREIGN PATENT DOCUMENTS

| EP | 1445232 A2 | 11/2004 |
|---|---|---|
| WO | 96/06064 A1 | 2/1996 |

(Continued)

OTHER PUBLICATIONS

"Iron Catalyzed CO2=Hydrogenation to Liquid Hydrocarbons," Rocco A. Fiato et al. Studies in Surface Science and Catalysis, vol. 114 (1998), pp. 339-344.*

(Continued)

*Primary Examiner* — Patricia L Hailey
(74) *Attorney, Agent, or Firm* — US Naval Research Laboratory; Stephen T. Hunnius (57) ABSTRACT

A catalyst support which may be used to support various catalysts for use in reactions for hydrogenation of carbon dioxide including a catalyst support material and an active material capable of catalyzing a reverse water-gas shift (RWGS) reaction associated with the catalyst support material. A catalyst for hydrogenation of carbon dioxide may be supported on the catalyst support. A method for making a catalyst for use in hydrogenation of carbon dioxide including application of an active material capable of catalyzing a reverse water-gas shift (RWGS) reaction to a catalyst support material, the coated catalyst support material is optionally calcined, and a catalyst for the hydrogenation of carbon dioxide is deposited on the coated catalyst support material. A process for hydrogenation of carbon dioxide and for making syngas comprising a hydrocarbon, esp. methane, reforming step and a RWGS step which employs the catalyst composition of the present invention and products thereof.

12 Claims, 5 Drawing Sheets

(56) References Cited

U.S. PATENT DOCUMENTS

| | | | |
|---|---|---|---|
| 2,692,274 A * | 10/1954 | Kolbel et al. | 518/706 |
| 4,683,218 A * | 7/1987 | Slaugh | 502/302 |
| 4,687,753 A * | 8/1987 | Fiato et al. | 502/5 |
| 5,140,049 A * | 8/1992 | Fiato et al. | 518/700 |
| 5,952,540 A * | 9/1999 | Lee et al. | 585/733 |
| 6,623,720 B2 * | 9/2003 | Thompson et al. | 423/656 |
| 7,160,533 B2 * | 1/2007 | Hagemeyer et al. | 423/655 |
| 7,179,442 B2 * | 2/2007 | Hagemeyer et al. | 423/655 |
| 7,687,051 B2 * | 3/2010 | Hagemeyer et al. | 423/655 |
| 7,704,486 B2 * | 4/2010 | Ilinich et al. | 423/656 |
| 7,744,849 B2 * | 6/2010 | Hagemeyer et al. | 423/656 |
| 8,003,565 B2 * | 8/2011 | Hagemeyer et al. | 502/326 |
| 8,017,658 B2 * | 9/2011 | Tran et al. | 518/715 |
| 8,080,224 B2 * | 12/2011 | Takeda et al. | 423/213.2 |
| 2003/0113244 A1 | 6/2003 | Dupont et al. | |
| 2007/0140953 A1 * | 6/2007 | Ruettinger et al. | 423/648.1 |
| 2007/0183968 A1 * | 8/2007 | Healey et al. | 423/656 |

FOREIGN PATENT DOCUMENTS

| | | | | |
|---|---|---|---|---|
| WO | 2005/026093 A1 | | 3/2005 | |
| WO | 2011/056715 | * | 5/2011 | B01J 29/06 |

OTHER PUBLICATIONS

"Carbon dioxide hydrogenation over Fe—Ce catalysts," F. J. Perez-Alonso et al. Catalysis Communications 9 (2008), pp. 1945-1948.*

C2—C5+ olefin production from CO2 hydrogenation using ceria modified Fe/Mn/K catalysts, Robert W. Dorner et al. Catalysis Communications 15 (2011), pp. 88-92.*

Van Der Laan, et al., "Intrinsic kinetics of the gas-solid Fischer-Tropsch and water gas shift reactions over a precipitated iron catalyst," Applied Catalysis A: General, vol. 193, 2000, pp. 39-53, The Netherlansds.

Collin, et al., "Electrochemical Reduction of Carbon Dioxide Mediated by Molecular Catalysts," Coordination Chemistry Reviews, 1989, pp. 245-268, 93, Elsevier Science Publishers B.V., The Netherlands.

Riedel, et al., "Kinetics of CO2 Hydrogenation on a K-Promoted Fe Catalyst," Ind. Eng. Chem. Res., 2001, pp. 1355-1363, 40, Germany.

Riedel, et al., "Comparative study of Fischer, Tropsch synthesis with H2/CO and H2/CO2 syngas using Fe- and Co-based catalysts," Applied Catalysis A: General, vol. 186, 1999, pp. 201-213, Germany.

Pettigrew, et al., "The effects of rare earth oxides on the reverse water-gas shift reaction on palladium/alumina," Catalysis Letters, vol. 28, 1994, pp. 313-319, J.C. Baltzer AG, Science Publishers, Australia.

Nikulshina, et al., "CO2 capture from atmospheric air via consecutive CaO-carbonation and CaCO3-calcination cycles in a fluidized-bed solar reactor," Chemical Engineering Journal, 2009, pp. 244-248, 146, Elsevier B.V., Switzerland.

Russell, et al., "Catalytic Hydrogenation of Carbon Dioxide to Higher Hydrocarbons," Journal of the American Chemical Society, 1950, pp. 2446-2454, vol. 72, United States of America.

Li, et al., "Promoted Iron-Based Catalysts for the Fischer-Tropsch Synthesis: Design, Synthesis, Site Densities and Catalytic Properties," Journal of Catalysis, 2002, pp. 202-217, vol. 206, Berkeley, California.

Li, et al., "Low-temperature water-gas shift reaction over Cu- and Ni-loaded cerium oxide catalysts," Applied Catalysis B: Environmental, 2000, pp. 179-191, vol. 27, Elsevier Science B.V., Medford, Massachusetts.

Hesse, et al., "Unifit 2002—universal analysis software for photoelectron spectra," Anal. Bioanal. Chem., 2003, pp. 856-863, vol. 375, Germany.

Dorner, et al., "Influence of Gas Feed Composition and Pressure on the Catalytic Conversion of CO2 to Hydrocarbons Using a Traditional Cobalt-Based Fischer-Tropsch Catalyst," Energy & Fuels, 2009, pp. 4190-4195, vol. 23, American Chemical Society, Lexington, Kentucky.

Dorner, et al., "K and Mn doped iron-based CO2 hydrogenation catalysts: Detection of KAlH4 as part of the catalyst's active phase," 2009, Applied Catalysis A: Gen., doi10.1016/j.apcata.2009.11.005, Washington, D.C.

Avalos-Rendon, et al., "Thermochemical Capture of Carbon Dioxide on Lithium Aluminates (LiAlO2 and Li5AlO4): A new Option for the CO2 Absorption," J. Phys. Chem. A, 2009, pp. 6919-6923, American Chemical Society, Mexico.

Willauer, et al., "Effects of Pressure on the Recovery of CO2 by Phase Transition from a Seaweter System by Means of Multilayer Gas Permeable Membranes," J. Phys. Chem. A, 2010, pp. 4003-4008, vol. 114, American Chemical Society, United States of America.

Willauer, et al., "Recovery of CO2 by Phase Transition from an Aqueous Bicarbonate System under Pressure by Means of Multilayer Gas Permeable Membranes," Energy & Fuels, 2009, pp. 1770-1774, vol. 23, American Chemical Society, United States of America.

* cited by examiner

CATALYTIC SUPPORT FOR USE IN CARBON DIOXIDE HYDROGENATION REACTIONS

This application claims priority to, and the benefit of, the U.S. Provisional Application Ser. No. 61/257,909, filed Nov. 4, 2009, the entirety of which is herein incorporated by reference.

BACKGROUND OF THE INVENTION

1. Field of the Invention

The present invention relates to the field of catalysts for hydrogenation of carbon dioxide. In particular, the present invention relates to supported catalysts for hydrogenation of carbon dioxide wherein the catalyst support is coated with a material capable of catalyzing a reverse water-gas shift reaction.

2. Description of the Related Technology

Increasing awareness of the environmental impact of carbon dioxide ($CO_2$) emissions has lead to an immense increase in research and development efforts to bind $CO_2$. Proposals range from capturing $CO_2$ directly from the flue gas emitted by heavy industry or from the atmosphere by binding it in inorganic oxides. Avalos-Rendon, et al., *Journal of Physical Chemistry A* 113, 6919 (2009) and Nikulshina, V., et al., *Chemical Engineering Journal* 146 (2), 244 (2009). One approach is to reduce the CO2 over catalysts, to convert it to more valuable hydrocarbons using photochemical, electrochemical or thermochemical processes.

Electrochemical and photochemical $CO_2$ conversion is still in its infancy and at present has major drawbacks. Photocatalysts tend to require a sacrificial electron donor. Collin, J. P. and Sauvage, J. P., *Coordination Chemistry Reviews* 93 (2), 245 (1989) and Fujita, E., Hayashi, Y., Kita, S., and Brunschwig, B. S., *Carbon Dioxide Utilization for Global Sustainability* 153, 271 *Sustainability* 153, 271 (2004). Further, neither photocatalytic nor electrocatalytic conversion of $CO_2$ yield long chain hydrocarbons nor do they show very high $CO_2$ conversion efficiencies. Noda, H. et al., *Bulletin of the Chemical Society of Japan* 63 (9), 2459 (1990).

Thermochemical $CO_2$ conversion, in contrast, has been known for several decades and is presently the most proven and successful approach to producing hydrocarbons (HC) above methane at high conversion yields. Russell, W. W. and Miller, G. H., *Journal of the American Chemical Society* 72 (6), 2446 (1950) and Dorner, R. W., Hardy, D. R., Williams, F. W., and Willauer, H. D., *Applied Catalysis A: General* (2009). This research is primarily driven by the U.S. military's significant demand for jet fuel and the associated target of increasing energy independence and battlefield readiness as well as reducing $CO_2$ emissions, in light of the impending introduction of the cap-and-trade system. One can envisage a process leading to jet fuel, where the needed carbon source is obtained by harvesting $CO_2$ dissolved in the ocean (primarily in the form of bicarbonate) and hydrogen through the electrolysis of water. Willauer, H. D.; et al., *Energy & Fuel* 23, 1770 (2009) and Willauer, H. D., et al., "Effects of Pressure on the Recovery of CO2 by phase Transition from a Seawater System by Means of Multilayer Gas Permeable Membranes", *J Phys Chem A, in press* (2009). $CO_2$ and $H_2$ can subsequently be reacted over a heterogeneous catalyst to form hydrocarbons of desired chain length and type.

A key problem with this scenario is the low conversion yield of $CO_2$ hydrogenation processes. Thus, a significant increase in the conversion yield of $CO_2$ hydrogenation catalysts will enhance the feasibility of the above-mentioned process.

The target of achieving a high yield, high selectivity process for $CO_2$ hydrogenation to jet fuel can be achieved by use of a two step synthesis process, involving initial $CO_2/H_2$ conversion to olefins and subsequent oligomerization over a solid acid catalyst to jet fuel. Even when using syngas (CO/$H_2$), direct synthesis of jet fuel is limited by Anderson-Schulz-Flory (ASF) kinetics to a selectivity of around 50%. However, this type of selectivity can only be achieved when employing a catalyst that exhibits an extremely high chain growth probability of 0.9, which in $CO_2$ hydrogenation has not been observed before. Van der Laan, G. P. and Beenackers, A., *Catalysis Reviews—Science and Engineering* 41 (3-4), 255 (1999). Consequently, a two-step process is advantageous in comparison to the direct route to jet-fuel.

A conversion of 41.4% of $CO_2/H_2$ over a K/Mn/Fe catalyst supported on alumina and an olefin/paraffin ratio of 4.2 has been reported. Dorner, R. W., Hardy, D. R., Williams, F. W., and Willauer, H. D., *Applied Catalysis A: General* (2009). Initial tests on a cobalt-based catalyst yielded predominantly methane ($CH_4$), with no carbon monoxide (CO) detected in the product effluent. Dorner, R. W. et al., *Energy Fuels* 23 (8), 4190 (2009).

The conversion of $CO_2$ to long chain hydrocarbons has been established to go through a 2-stage reaction mechanism over iron catalysts, with initial conversion of $CO_2$ to CO on the iron's magnetite phase (Lox, E. S, and Froment, G. F., *Industrial & Engineering Chemistry Research* 32 (1), 71 (1993)), followed by chain growth as observed in Fischer-Tropsch (FT) synthesis on iron carbide surface species. Riedel, T., et al., *Industrial & Engineering Chemistry Research* 40 (5), 1355 (2001); Bukur, D. B., et al., *Journal of Catalysis* 155 (2), 366 (1995); Herranz, T. et al., *Applied Catalysis a—General* 311, 66 (2006); and Li, S. Z. et al., *Journal of Catalysis* 206 (2), 202 (2002).

In cobalt-systems however, the predominant reaction seems to be $CO_2$ conversion directly to methane due to cobalt's limited water-gas shift (WGS) activity. Based on this model, the approach within entails the development of a bifunctional catalyst that includes both reverse water-gas shift (RWGS) activity as well as FT chain growth activity on the catalyst's surface. The addition of a second, separate reverse water gas shift (RWGS) catalyst to a cobalt Fischer-Tropsch catalyst within the same reactor would not suffice in achieving $CO_2$ conversion to long chain HC, as due to thermodynamic restrictions the carbon monoxide's partial pressure within the reactor would remain too low and insufficient to establish an FT regime. Riedel, T. et al., *Applied Catalysis A—General* 186 (1-2), 201 (1999).

It is known, that the RWGS reaction can take place over promoted ceria at modest temperatures, with an equilibrium constant of 16% reported over a Pd/$CeO_2$ catalyst at 300° C. and an equimolar $CO_2$: $H_2$ feed. Pettigrew, D. J., Trimm, D. L., and Cant, N. W., *Catalysis Letters* 28 (2-4), 313 (1994). However, if one replaced palladium with iron, a lower equilibrium constant can be expected, as iron catalyses the RWGS to a lesser extent than palladium does. Hilaire, S. et al., *Applied Catalysis A—General* 258 (2), 269 (2004). The RWGS takes advantage of ceria's oxygen storage ability, involving the redox process over the $Ce^{4+}/Ce^{3+}$ couple. It has been proposed that the reaction proceeds via reduction of $CeO_2$ by hydrogen to $Ce_2O_3$, producing water in the process. Subsequently $CO_2$ can then be expected to re-oxidize $Ce_2O_3$, restoring the initial $CeO_2$ species and yielding CO. Pettigrew, D. J., Trimm, D. L., and Cant, N. W., *Catalysis Letters* 28 (2-4), 313 (1994). Rates are however partially limited by $H_2O$ re-oxidizing $Ce_2O_3$. Hilaire, S. et al., *Applied Catalysis A—General* 258 (2), 269 (2004). The addition of base metals to ceria is known to be beneficial for the RWGS, by reducing the activation energy and increasing the reducibility of ceria. Li, K., Fu, Q., and Flytzani-Slephanopoulos, M., *Applied Catalysis B-Environmental* 27 (3), 179 (2000).

In WO 96/06064 A1 a process for methanol production is described, which comprises a step of converting part of the carbon dioxide contained in a feed mixture with hydrogen to carbon monoxide, in the presence of a catalyst that can be used for the WGS reaction; exemplified by Zn—Cr/alumina and $MoO_3$/alumina.

WO 2005/026093 A1 discloses a process for producing DME, which comprises a step of reacting carbon dioxide with hydrogen in a RWGS reactor to provide carbon monoxide, in the presence of a supported catalyst selected from ZnO; $MnO_x$ (x=1~2); an alkaline earth metal oxide and NiO.

EP 1445232 A2 discloses a (reverse) water gas shift reaction for production of carbon monoxide by hydrogenation of carbon dioxide at high temperatures, in the presence of a Mn—Zr oxide catalyst.

A drawback of the known process as disclosed in US 2003/0113244 A1 is the selectivity of the catalyst employed; that is no long chain hydrocarbons are formed. Energy intense conversion of $CO_2$ to CO has to occur prior to upgrading, in a separate reactor.

The object of the present invention is therefore to provide a catalyst that shows improved selectivity and yield in reducing carbon dioxide with hydrogen, with only very little methane formation, and with good catalyst stability.

SUMMARY OF THE INVENTION

In a first aspect, the present invention relates to a catalyst support which may be used to support various catalysts for use in reactions for hydrogenation of carbon dioxide. The catalyst support of the invention comprises a catalyst support material and an active material capable of catalyzing a reverse water-gas shift (RWGS) reaction.

In a second aspect, the present invention relates to a catalyst for use in hydrogenation of carbon dioxide. The catalyst of the invention comprises a catalyst for hydrogenation of carbon dioxide supported on a catalyst support which comprises catalyst support material and an active material capable of catalyzing a reverse water-gas shift (RWGS) reaction associated with the catalyst support.

In a third aspect, the present invention relates to a method for making a catalyst for use in hydrogenation of carbon dioxide. In the method, an active material capable of catalyzing a reverse water-gas shift (RWGS) reaction is applied to a catalyst support material, then, the combination of the catalyst support and active material is optionally calcined, and a catalyst for the hydrogenation of carbon dioxide is deposited on the coated catalyst support material.

The invention also relates to a process for hydrogenation of carbon dioxide, as well as an integrated process for making syngas comprising a hydrocarbon, esp. methane, reforming step and a RWGS step which employs the catalyst composition of the present invention.

The invention further relates to the use of the syngas mixture obtained with the process according to the invention as feed material for a process of making a chemical product; such as, for example, methanol production, olefin and alkane synthesis (e.g. via Fischer-Tropsch reaction), aromatics production, oxosynthesis, carbonylation of methanol or carbonylation of olefins.

The invention further relates to a process for making a chemical product using a syngas mixture as an intermediate or as feed material, which process comprises a step wherein carbon dioxide is hydrogenated in the presence of a catalyst according to the invention. Examples of such a process include methanol production, olefin and alkane synthesis, aromatics production, oxosynthesis, carbonylation of methanol or carbonylation of olefins.

DETAILED DESCRIPTION OF THE PREFERRED EMBODIMENT(S)

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

With the catalyst and process according to the present invention, carbon dioxide can be hydrogenated into carbon monoxide with high selectivity, the catalyst showing good stability over time and under variations in processing conditions. Also, formation of methane is suppressed; typically, only small amounts of methane are found in the product mixture formed by the process according to the invention.

Fischer-Tropsch based reactions are the reactions that produce hydrocarbons and water from a carbon source, such as carbon dioxide and carbon monoxide, and hydrogen:

$$CO+2H_2 \rightarrow -(CH)_2-+H_2O$$

$$CO_2+3H_2 \rightarrow -(CH)_2-+2H_2O$$

In a first aspect, the present invention relates to a catalyst support, which may be used to support various materials or catalysts for use in reactions for converting carbon dioxide and hydrogen to hydrocarbons. The catalyst support of the invention comprises a catalyst support material and another material associated with the catalyst support material such as a coating, deposit, impregnation or a material applied by any other suitable mode of application of a of a material capable of catalyzing a reverse water-gas shift (RWGS) reaction.

The catalyst used in the process according to the invention includes an inert carrier or catalyst support material, of certain particle size and geometry. Suitable supports include those materials having good stability at the reaction conditions to be applied in the process of the invention, and are known by a person skilled in the art of catalysis. Preferably, the support material is at least one member selected from the group consisting of alumina, magnesia, silica, titania, zirconia, sulfated $ZrO_2$, $WO_3ZrO_2$, zeolites such as, for example, H-Beta zeolites, silicas such as Sylopol®, $AlF_3$, fluorided $Al_2O_3$, bentonite, and $SiO_2/Al_2O_3$, as well as carbon-based supports, molecular sieves such as mesoporous molecular sieves containing amorphous silica, e.g. MCM-41 and MCM-48, and combinations thereof. Gamma-alumina is a preferred catalyst support material.

$CO_2$ conversion levels reported on catalysts dispersed over supports made only from these materials have been low since these supports only act as a stabilizer for the dispersed catalyst. Lanthanide oxides or (oxy)carbonate, e.g. $La_2O_3$ may also be used as support, but also contributes to catalyst activity.

The active material associated with the catalyst support material is a material which is capable of catalyzing a reverse water-gas shift reaction (RWGS) reaction. Suitable materials include, but are not limited to, one or more oxides or carbides of transition metals or lanthanides. Ceria is the preferred active material for use in the catalyst support of the present invention.

Associating the catalyst support with an active material capable of catalyzing a reverse water-gas shift reaction (RWGS) reaction provides both a support and an introduced catalytic activity of the material associated with the support, in the form of reverse water-gas shift catalytic activity. It is known that to achieve $CO_2$ hydrogenation to long-chain hydrocarbons, $CO_2$ needs to initially be converted to CO, which is subsequently converted to aforementioned hydrocarbons via the Fischer-Tropsch synthesis. The addition of a material which catalyzes a reverse water-gas shift reaction (RWGS) reaction facilitates the reverse water-gas shift reaction (i.e. $CO_2+H_2 \leftrightarrow CO+H_2O$) and thus leads to an overall higher $CO_2$ conversion relative to a conventional support containing the same dispersed $CO_2$ hydrogenation catalyst.

Any suitable method may be employed to associate the active material with the catalyst support material. Suitable methods include, but are not limited to, an incipient wetness impregnation method, atomic layer deposition, sol-gel, salt reduction, precipitation, chemical vapor deposition and dispersion. As a result, the association between the active material and the catalyst support material may be as a coating, it may be impregnated, a deposition layer, the active material may be bound or attached to the catalyst support material or the active material be in any other physical form capable of being produced by the foregoing methods.

Calcining the catalyst support and active material at elevated temperatures (i.e. 800° C.) may lead to the formation of larger crystallites of the active material, which may be advantageous relative to smaller crystallites, as the smaller crystallites appear to be covered to a larger degree by the active carbon dioxide hydrogenation catalyst which is subsequently deposited on the catalyst support of the invention. Calcining of the combined active material and catalyst support of the present invention at lower temperatures (i.e. 500° C.) led to an improvement over an uncoated alumina support in hydrogenation of carbon dioxide. Calcining can be carried out at any suitable temperature in the range of 150 to 1300° C., preferably in the range of 450 to 900° C. and most preferably in the range of 500 to 850° C. Calcining is typically carried out over a carried out over a period of 10 to 300 minutes, but the duration of calcination can be longer.

Another metal can be added to the active material to increase the support's reverse water-gas-shift reaction, such as a transition metal and/or a lanthanide.

The amount of support material present in the catalyst used in the process according to the present invention may vary within broad ranges; a suitable range is from 40 to 95 mass % (based on total mass of catalyst composition). Preferably, the support forms from 50 to 90 mass %, more preferably from 60 to 85 mass % of total catalyst composition. In case of lanthanide oxides, the lanthanide content may vary from 0.1 to 95 mass %.

The content of the active material may vary within broad ranges. A certain minimum active material content is needed to reach a desired level of catalyst activity. A suitable range of active material is from 1 to 95 mass % (elemental metal based on total mass of catalyst composition). Preferably, the elemental metal content is from 5 to 50 mass %, a more preferred range is from 10 to 20 mass %.

Forming a stable combination of active material and catalyst support prior to depositing the $CO_2$ hydrogenation catalyst provides a significantly enhanced $CO_2$ conversion in subsequent conversion reactions conducted over a supported catalyst fabricated in this manner. Ceria is a preferred active material for the support since it enhances formation of CO as an intermediate in the conversion of $CO_2$ to hydrocarbons. Comparatively, the addition of ceria directly to the $CO_2$ hydrogenation catalyst, rather than as, for example, a coating on the catalyst substrate, actually diminishes the $CO_2$ conversion levels of the catalyst material by forming a surface layer over the catalyst. Thus, the ceria needs to be part of the support in order to provide the effect demonstrated by the present invention.

The present invention also relates to a method for making a catalyst support for use in hydrogenation of carbon dioxide. In the method, an active material capable of catalyzing a reverse water-gas shift (RWGS) reaction is associated with a catalyst support material, the combination of active material and catalyst support material is optionally calcined, and a catalyst for the hydrogenation of carbon dioxide is deposited on the calcined active material and catalyst support material. The method may be carried out as discussed above, e.g. by application of a coating to a catalyst support material and optionally calcining the coated catalyst support material. A suitable catalyst component may subsequently be deposited on the catalyst support to form a catalyst for hydrogenation of carbon dioxide.

The catalyst component that is used in the process of the invention may be prepared by any conventional catalyst synthesis method as known in the art. Generally such process includes the steps of making aqueous solutions of the desired metal components, for example from their nitrate or other soluble salt; impregnating the solutions onto a support material; forming a solid catalyst precursor by precipitation (or impregnation) followed by removing water and drying; and then calcining the precursor composition by a thermal treatment in the presence of oxygen.

The process of the invention shows good catalyst stability, also at temperatures of above about 600° C.; meaning that the composition of the product mixture varies little over time. The reaction can be performed over a wide pressure range, from atmospheric conditions up to e.g. 6 MPa.

Within the context of the present application, a catalyst that substantially consists of metal oxide, carbide or hydroxide and other specific elements is understood to mean that the specified metals in elemental form, or in the form of their oxides, carbides or hydroxides form the active sites of the catalyst composition. The catalyst may further comprise other components, including a support, a binder material, or other components including usual impurities, as known to the skilled person.

In the process according to the invention, any suitable catalyst for hydrogenation of carbon dioxide may be employed. The catalyst is immobilized on the coated support of the present invention. In one embodiment, the catalyst contains one or more metals in elemental form, or in the form of their oxides, carbides or hydroxides, wherein the metals are selected from the group consisting of Fe, K, Mn, Pd, Co, Cr, Ni, La, Ce, W, Pt, Cu, Na, Cs and various mixtures thereof. One suitable catalyst is a mixture of iron, manganese and potassium.

The metal content of the catalyst material may vary within broad ranges. A certain minimum metal content is needed to reach a desired level of catalyst activity, but a high content will increase the chance of particle (active site) agglomeration, and reduce efficiency of the catalyst. A suitable range is from 1 to 50 mass % (elemental metal based on total mass of catalyst composition). Preferably, the elemental metal content is from 5 to 30 mass %, a more preferred range is from 10 to 20 mass %.

The amount of each metal component present in the catalyst used in the process according to the present invention may vary within broad limits; a suitable range is from 0.1 to 50 mass % (metal content based on total mass of catalyst composition). Preferably, said metal content is from 0.2 to 30 mass %, more preferably the range is from 0.3 to 20 mass %.

Preferably, the catalyst used in the process according to the invention further comprises at least one alkali or alkaline earth metal, because this further increases surface basicity, and thus improves the catalyst's yield and selectivity. More preferably, said alkali or alkaline earth metal is selected from the group consisting of Li, Na, K, Cs and Sr. The advantage of such catalysts is that side-reactions in the process of the invention are effectively suppressed, especially the methanation reaction. If the catalyst comprises a support material, an additional advantage of these metals being present is that the catalyst is more robust, i.e. has better mechanical stability.

The amount of each alkali or alkaline earth metal component present in the catalyst used in the process according to the present invention may vary within broad ranges; a suitable range is from 0.1 to 50 mass % (metal content based on total mass of catalyst composition). Preferably, said metal content is from 0.2 to 30 mass %, more preferably the range is from 0.3 to 20 mass %.

The catalyst may be applied in the process of the invention in various geometric forms, for example as spherical pellets.

In the process according to the invention the step of contacting the gaseous feed mixture containing carbon dioxide and hydrogen with a catalyst can be performed over a wide temperature range. As the reaction is endothermic, a high temperature will promote conversion, but too high temperature may also induce unwanted reactions; therefore this step is preferably performed at a temperature ranging from 100 to 500° C., more preferably from 200 to 450° C., even more preferred from 250 to 350° C.

The step of contacting the gaseous feed mixture containing carbon dioxide and hydrogen with a catalyst according to the process of the invention can be performed over a wide pressure range. A higher pressure tends to enable lower reaction temperatures, but very high pressures are not practical; therefore this step is preferably performed at a pressure ranging from 0.1 to 6 MPa, more preferably from 0.5 to 5 MPa, or from 1 to 3.5 MPa.

The contact time in the step of contacting the gaseous feed mixture containing carbon dioxide and hydrogen with a catalyst according to the process of the invention may vary widely, but is preferable from 0.5 to 6 seconds, more preferably from 1.5 to 5 seconds, or from 2 to 4 seconds.

The process according to the invention can be performed in conventional reactors and apparatuses; which are, for example, also used in methane reforming reactions. The skilled man will be able to select a suitable reactor set-up depending on specific conditions and circumstances. Suitable types of reactors include continuous fixed bed reactors or a continuous stirred tank reactor, but are not limited to such reactors. In view of the high reaction temperature, and catalytic activity of some metals like Ni in methanation reactions, use of a material comprising Ni or other active metals for making reactors walls etc. is preferable avoided. For this reason it is preferred to apply e.g. glass linings for relevant reactor parts.

In the process according to the present invention, carbon dioxide is selectively converted into carbon monoxide by a reverse water gas shift reaction in the presence of a specific catalyst. The resulting product of this $CO_2$ hydrogenation process is a gas mixture containing carbon monoxide and water, and non-converted carbon dioxide and hydrogen. This can, in case of excess hydrogen, also be represented by the following equation:

$$CO_2 + nH_2 \leftrightarrows CO + (n-1)H_2 + H_2O$$

The water formed in this reaction is generally removed from the product stream, because this will drive the equilibrium reaction in the desired direction, and because water may interfere with subsequent reactions of the syngas. Water can be removed from the product stream using any suitable method known in the art, e.g. by condensation and liquid/gas separation.

The amount of hydrogen in the feed gas, that is the value for n in the above reaction scheme, may vary widely, for example from n=1 to n=5, to result in a syngas composition, e.g. expressed as its $H_2/CO$ ratio or as the stoichiometric number (SN), which can consequently vary within wide limits. The advantage thereof is that the syngas composition can be adjusted and controlled to match the desired use requirements.

Preferably, SN of the produced syngas mixture is from 0.1 to 4.0; more preferably SN is from 0.5 to 3.5 or even from 1.0 to 3.0. Such syngas product streams can be further employed as feed stock in different syngas conversion processes, like methanol formation, olefin synthesis, reduction of iron oxide in steel production, oxosynthesis, or (hydro)carbonylation reactions.

The molar ratios of $CO_2$ and $H_2$ may be varied in the reactor to influence the composition of the resulting in a syngas composition. For example, the feed gas may contain $CO_2$ and $H_2$ in molar ratio of about 1:3 (n=3 in above equation), resulting in a syngas composition with $H_2$/CO or SN of about 2; which can be advantageously used in olefin or methanol synthesis processes.

The carbon dioxide in the gaseous feed mixture used in the process of the invention can originate from various sources. Preferably, the carbon dioxide comes from a waste gas stream, e.g. from a plant on the same site, like for example from ammonia synthesis, optionally with (non-catalytic) adjustment of the gas composition, or after recovering the carbon dioxide from a gas stream or from the environment. Recycling such carbon dioxide as starting material in the process of the invention thus contributes to reducing the amount of carbon dioxide emitted to the atmosphere (from a chemical production site). The carbon dioxide used as feed may also at least partly have been removed from the effluent gas of the RWGS reaction itself.

The gaseous feed mixture comprising carbon dioxide and hydrogen used in the process of the invention may further contain other gases, provided that these do not negatively affect the reaction. Examples of such other gases include steam or an alkane, like methane, propane or iso-butane. An advantage of such a process according to the invention is that the carbon dioxide hydrogenation reaction can be combined and even integrated with for example steam reforming of methane or with dry reforming of methane (also called $CO_2$ reforming). An additional advantage hereof is that water formed by $CO_2$ hydrogenation can react with methane to produce more hydrogen; even such that the water level in the final product is very low.

The invention thus also relates to an integrated process for making syngas comprising a hydrocarbon, esp. methane, reforming step and a RWGS step as defined in the above. Preferably, the hydrogen to carbon dioxide ratio in the feed mixture is at least 2 in this combined process according to the invention, because such excess hydrogen in the gas streams prevents coke formation, which could otherwise de-activate the catalyst; and thus this process results in good catalyst stability.

The invention further relates to the use of the syngas mixture obtained with the process according to the invention as feed material for a process of making a chemical product; like methanol production, olefin and alkane synthesis (e.g. via Fischer-Tropsch reaction), aromatics production, oxosynthesis, carbonylation of methanol or carbonylation of olefins.

The invention therefore further relates to a process for making a chemical product using a syngas mixture as an intermediate or as feed material, which process comprises a step wherein carbon dioxide is hydrogenated according to the invention. Examples of such a process include methanol production, olefin and hydrocarbon synthesis, aromatics production, oxosynthesis, carbonylation of methanol, or carbonylation of olefins.

The invention will be illustrated by the following non-limiting examples.

Example 1

Catalyst Support Preparation

Gamma alumina was used as support material. An incipient wetness impregnation method was used for catalyst preparation. $Ce(NO_3)_3.6H_2O$ and alumina were added to a flask containing deionized water at the concentrations required to obtain the desired weight ratio of 12/100 Ce/Al. These impregnated samples were then dried at 373K in ambient air. Finally, the support was calcined at 1073K for 4 hours, under static air conditions. Subsequently, the active $CO_2$ hydrogenation catalyst was dispersed over the support by co-incipient wetness impregnation (co-IWI).

Description of the Support's Operation and Use

Figure 1:
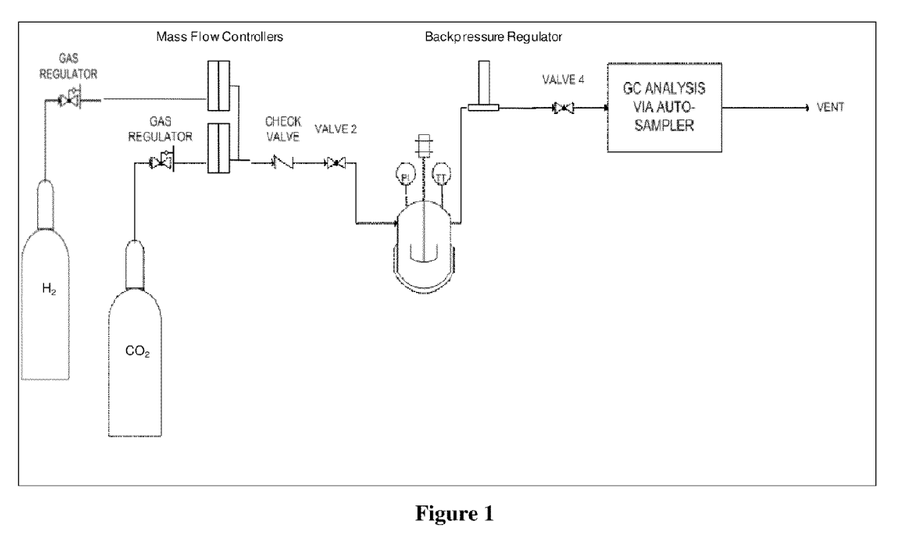
FIG. 1 shows the reactor setup employed in the Examples for carrying out the hydrogenation of carbon dioxide.

The reaction setup wherein the supported catalyst from Example 1 was employed is shown in FIG. 1. $CO_2$ hydrogenation reactions were conducted in a 1 L continuously stirred tank reactor. In a typical experiment, about 20 g of calcined catalyst were dispersed in approximately 400 ml of mineral oil (Aldrich) and subsequently reduced in-situ using CO at 290° C. for 48 hours. Two mass flow controllers regulated by a multi-gas controller, were used to adjust the flow rate of $CO_2$ and $H_2$. Hydrogenation of $CO_2$ was conducted at 290° C., 200 psig and a GHSV of 1400 $h^{-1}$ at a $H_2$:$CO_2$ ratio of 3:1. The effluent gases were analyzed online. The pressure in the reactor was kept constant.

The results showed that use of a Ceria-coated gamma-alumina as the support for the dispersed $CO_2$ hydrogenation catalyst will increase $CO_2$ conversion yield by at least 25% in comparison to dispersed $CO_2$ hydrogenated catalyst over uncoated gamma-alumina supports. This increase in yield is extremely high for any process in the petrochemical industry.

Example 2

Figure 2:
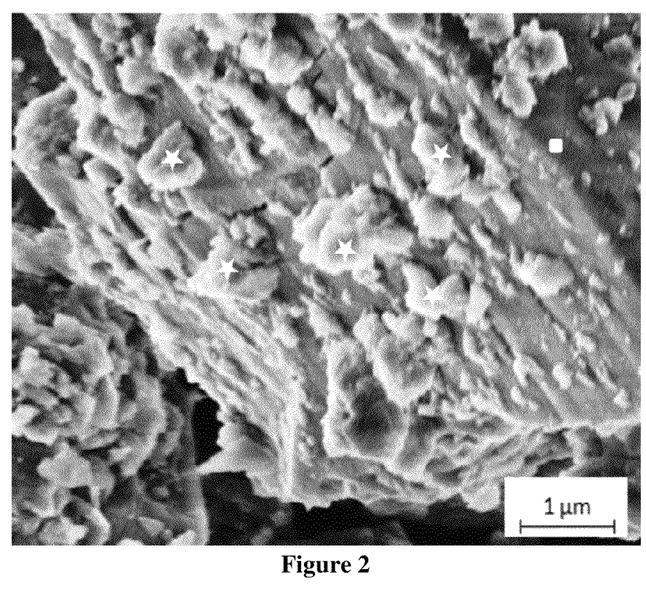
FIG. 2 is an SEM image of a ceria-coated gamma-alumina support calcined at 800° C., with the large ceria-particles referred to as "*", and the alumina support as "■". The ceria particles have particle sizes ranging from 500-800 nm.
Figure 3:
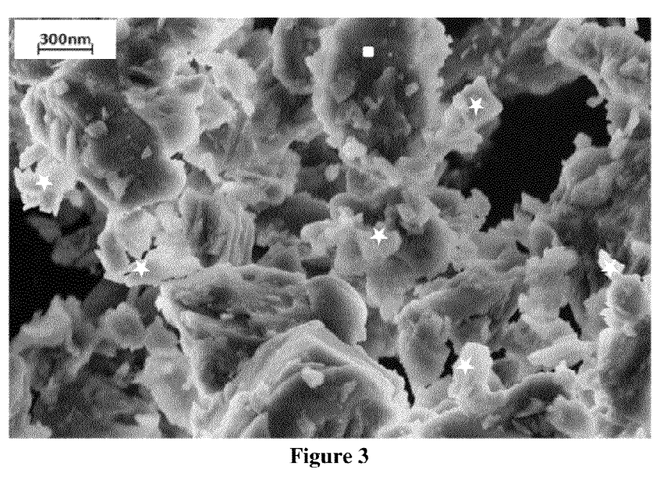
FIG. 3 is an SEM image of the ceria-coated gamma-alumina support calcined at 500° C., with the ceria-particles referred to as "*", and the alumina support as "■". The ceria particles have particle sizes ranging from 200-400 nm.
Figure 4:
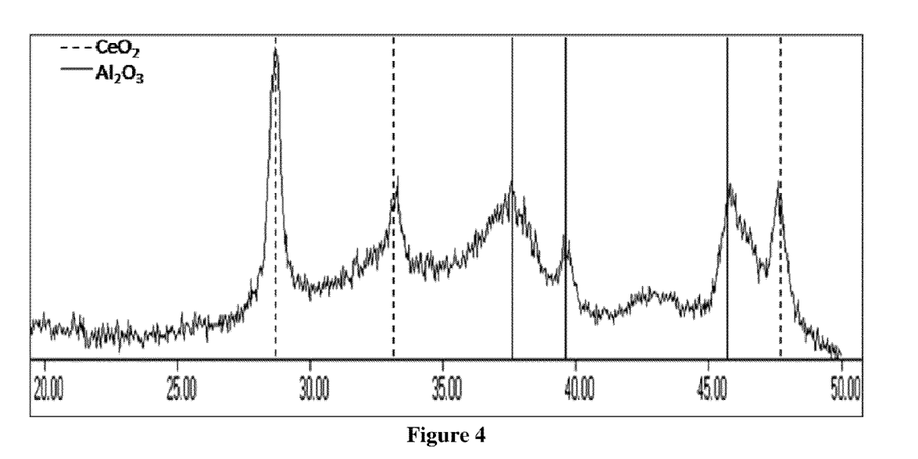
FIG. 4 is an x-ray diffraction pattern of a ceria-coated gamma-alumina support for FeMnKCeAl calcined at 800° C., with both phases indexed for peak assignment. The sharp and distinct diffraction peaks, associated with the ceria fluorite phase are a clear indication of the material's bulk formation. There is only a small intensity difference between FeMnKCeAl calcined at 500° C. and FeMnKCeAl calcined at 800° C., with the former showing slightly less sharp peaks.

Rather than calcining the catalyst at 800° C., the catalyst, prepared via an identical synthesis route was calcined at 500° C. A 12 wt % Ce/alumina support was prepared using IWI, which was followed by calcination for 4 hours at 500° C. The temperature at which the treatment occurs plays a pivotal role in modifying the ceria's morphology. While ceria nano-particles calcined at lower temperatures are smaller in diameter and show more lattice defects/oxygen vacancies, making them more active for the WGS activity, calcination at a higher temperature results in larger ceria particles, which concurrently leads to less oxygen vacancies. Smaller ceria Smaller ceria particles have also been reported to be more easily reduced than larger ones. SEM images of Ce/$Al_2O_3$ particles prepared at the different calcination temperatures show different particle sizes, with the ceria particles calcined at 500° C. having particle sizes ranging from 200-400 nm, and the ceria particles calcined at 800° C. having particle sizes ranging from 500-800 nm (see FIGS. 2 and 3). The XRD pattern of the ceria coated alumina show clear and distinct diffraction peaks associated with the $CeO_2$ fluorite lattice, corroborating the presence of large, crystalline particles on top of the alumina support (see FIG. 4).

Ceria is also known to act as a good growth substrate for metal clusters. Oxygen vacancies within the ceria lattice result in the localization of charge over the cations surrounding the vacancy, which in turn serve as nucleation sites for metal clusters. Having obtained the modified alumina support, the same Fe/Mn/K loading, namely 17 wt %, 12 wt % and 8 wt % respectively as was deposited on the support. However, due to the reduction in surface area of about 50% (from approximately 200 m²/g to 100 m²/g) upon ceria deposition, the amount of hydrogenation catalyst deposited on the surface was adjusted to provide the same amount of catalyst per surface area to allow an appropriate comparison between the samples. $CeO_2$ precipitation onto alumina is known to significantly reduce the support's surface area and pore volume, due to plugging of the pores by the ceria particles. The catalysts prepared had identical K, Mn, Fe and Ce loadings, with the only variation between them being the different calcination temperature of the Ce-impregnated support (denoted FeMnKCeAl500 and FeMnKCeAl800 for supports calcined at 500° C. and 800° C., respectively).

Both the FeMnKCeAl500 and FeMnKCeAl800 were tested for their activity in $CO_2$ hydrogenation, to establish the effect the calcination temperature has on $CO_2$ conversion ability. Based on the increased WGS activity of smaller ceria particles, one may expect that the FeMnKCeAl500 would outperform the FeMnKCeAl800 catalyst, showing that smaller nanoparticles containing more defects perform better in the RWGS reaction. Both catalysts showed a marked improvement in $CO_2$ conversion in comparison to the ceria-free catalyst, with $CO_2$ conversion increasing from 41.4% to 47.5% over the FeMnKCeAl500 catalyst and $CO_2$ conversion of 50.4% over the FeMnKCeAl800. Furthermore, besides the increase in $CO_2$ conversion a reduction in methane formation was observed over both the FeMnKCeAl500 catalyst and the FeMnKCeAl800 catalyst, in comparison to the ceria-free catalyst. Both catalysts also showed an increase in CO production relative to the ceria-free catalyst. All catalyst show comparable olefin/paraffin ratios as well as an equivalent affinity for the formation of the $C_2$-$C_{5+}$ fraction as shown in Table 1 below.

TABLE 1

Product selectivity, olefin/paraffin ratio and $CO_2$ conversion over K/Mn/Fe catalysts, impregnated on $Al_2O_3$, containing no ceria and ceria calcined at different temperatures.

| Catalyst | Selectivity (%, carbon base) | | | Olefin/ Paraffin | CO2 Conversion (%) |
|---|---|---|---|---|---|
| | C1 | C2-C5+ | CO yield | | |
| K/Mn/Fe—Al2O3 | 26.0 | 62.4 | 11.5 | 4.2 | 41.4 |
| FeMnKCeAl500 | 23.3 | 63.3 | 13.4 | 4.2 | 47.5 |
| FeMnKCeAl800 | 22.9 | 62.3 | 14.8 | 4.4 | 50.4 |

Figure 5:
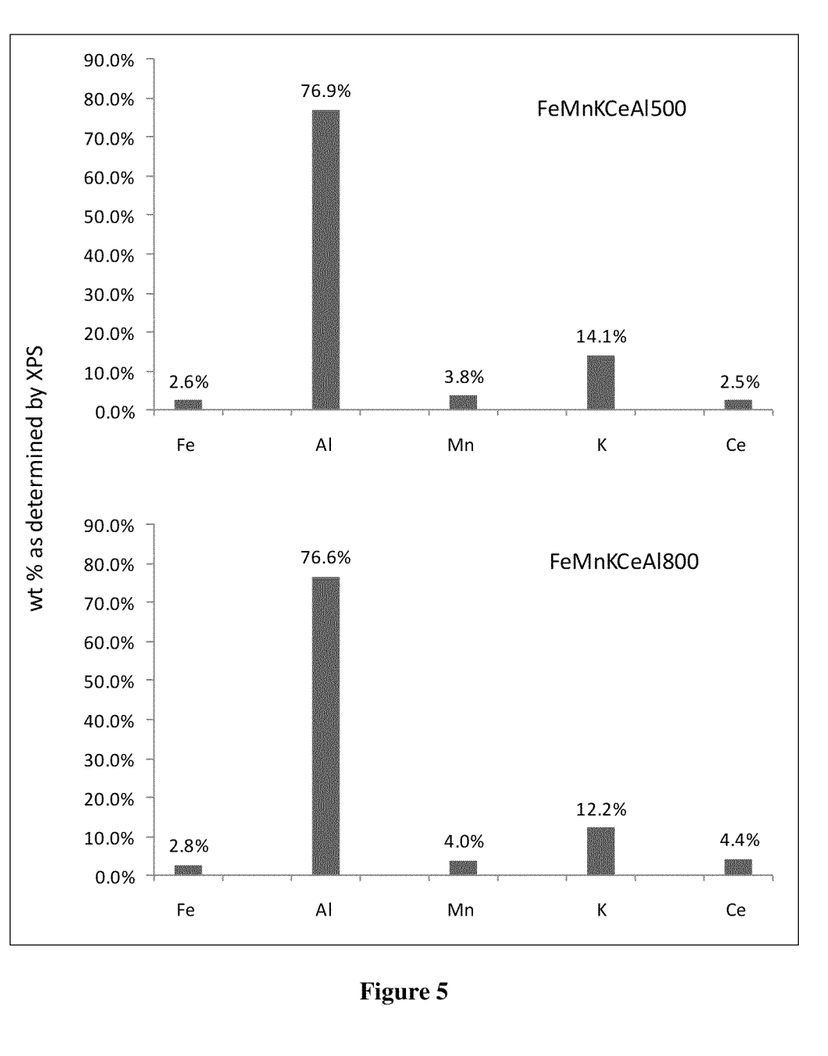
FIG. 5 shows XPS data, showing wt % of catalysts' elements. Both FeMnKCeAl calcined at 500° C. and FeMnKCeAl calcined at 800° C. show similar weight distributions, with FeMnKCeAl calcined at 500° C. having lower Ce-surface species. The concentration of surface species is in good agreement with the results reported over the K/Mn/Fe—Al2O2 catalyst, showing the comparability of the results.

The lower $CO_2$ conversion over the FeMnKCeAl500 catalyst in comparison to the FeMnKCeAl800 catalyst can be explained on the basis that coverage of the active sites for chain growth by other co-catalysts per unit surface area available has resulted in a diminished activity. FeMnKCeAl500 has a lower concentration of ceria surface species in comparison to FeMnKCeAl800 (by approx. 42%) as was deduced from XPS analyses (see FIG. 5). It can be concluded that upon precipitation of Fe, Mn and K onto the treated support, these metals form on top of the ceria grains resulting in a reduced availability of the active ceria sites for the RWGS.

Figure 6:
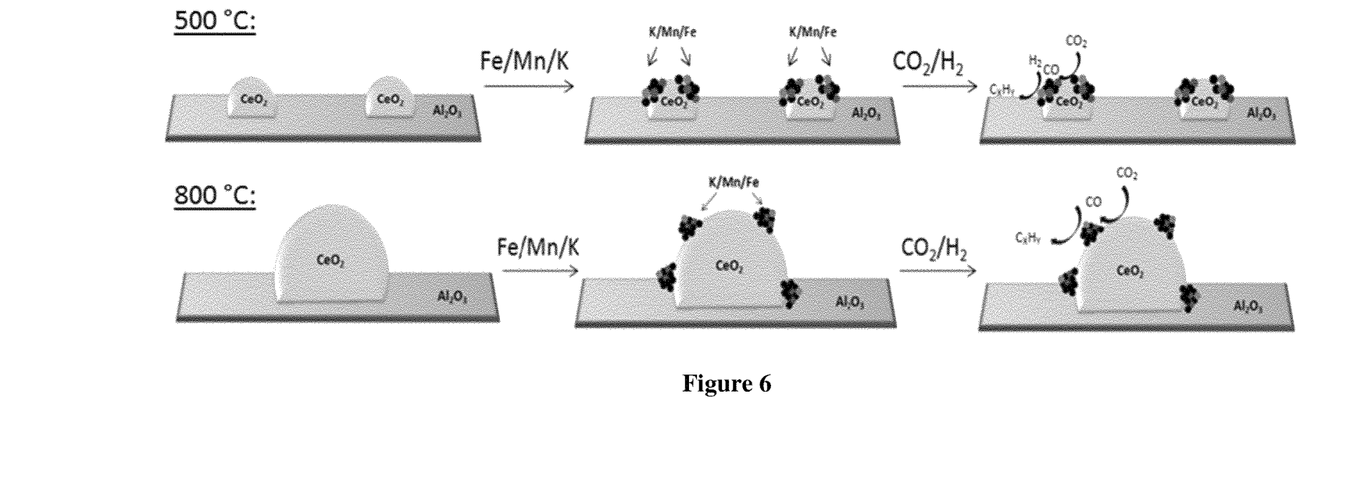
FIG. 6 shows schematics of the temperature effect on ceria particle size and the correlated changes in $CO_2$ conversion. With calcination at 500° C. smaller, more defective particles are formed leading to the Fe/Mn/K clusters covering larger areas of the ceria particles. The larger particles formed under calcination at 800° C. are covered to a lesser degree by the Fe/Mn/K particles, leading to a higher $CO_2$ conversion.

The reduced $CO_2$ conversion of FeMnKCe500 in comparison to FeMnKCe800 can be explained by the better dispersion of the $CO_2$ hydrogenation catalyst over the smaller ceria particles. As the number of defect sites on the ceria surface increases and thus the number of sites for Fe/Mn/K particle crystallization also increases, the $CO_2$ hydrogenation catalyst will be better dispersed over the ceria calcined at the lower temperature, resulting in a reduced surface availability of the ceria for the RWGS reaction to occur (see FIG. 6 for a schematic diagram of the catalytic system). Even though surface ceria is reduced by approximately 42% in FeMnKCeAl500 compared to FeMnKCeAl800 (see Table 2), the activity is only diminished by about 32%. This is indicative of the smaller ceria particles being indeed more active for the RWGS, showing an elevated reducibility and thus leading to a higher concentration of active sites per surface area for the RWGS.

TABLE 2

XPS data, showing peak assignment, area under the curve (measured in at. %) and correlated weight %

| | | | | |
|---|---|---|---|---|
| K8/Mn12/Fe17/ CeAl2O3 800 | Fe 2p | 709.3-712.5 | 3.4 | 2.8% |
| | Al 2p | 74 | 189.9 | 76.6% |
| | Mn 2p | 641 | 4.8 | 4.0% |
| | K2p | 293 | 21.0 | 12.2% |
| | Ce 3d 5/2 | 882 | 2.1 | 4.4% |
| | SUM | | 221.2 | 100.0% |
| K8/Mn12/Fe17/ CeAl2O3 500 | Fe 2p | 709.3-712.5 | 3.3 | 2.6% |
| | Al 2p | 74 | 205.0 | 76.9% |
| | Mn 2p | 641 | 5.0 | 3.8% |
| | K2p | 293 | 26.1 | 14.1% |
| | Ce 3d 5/2 | 882 | 1.3 | 2.5% |
| | SUM | | 240.7 | 100.0% |

These examples have shown a significant improvement of $CO_2$ hydrogenation ability over the iron-based catalyst through the addition of ceria. A truly bifunctional catalyst has been created that converts $CO_2/H_2$ to valuable HC by carefully adjusting the synthesis procedures. The present catalyst incorporates both RWGS activity and chain-growth to yield high $CO_2$ conversion levels. The addition of ceria prior to the deposition of the $CO_2$ hydrogenation catalyst results in an approximately 22% increase in $CO_2$ conversion, while the product selectivity is not detrimentally affected. It has also been shown that the calcination temperature prior to the deposition of Fe/Mn/K and the correlated ceria particle size may be used to tailor the catalyst's activity.

Experimental Methods Used in the Examples 20 g of calcined catalyst were dispersed in approximately 400 ml of mineral oil (Aldrich) in a 1 L three-phase slurry continuously stirred tank reactor (CSTR). Testing apparatus and conditions are reported in Dorner, R. W., Hardy, D. R., Williams, F. W., and Willauer, H. D., *Applied Catalysis A: General* (2009). Time-on-stream (TOS) for the catalyst was 100 hours.

BET surface areas were measured using a Micromeritics ASAP2010 accelerated surface area and porosimetry system. An appropriate amount (~0.25 g) of catalyst sample was taken and slowly heated to 200° C. for 10 h under vacuum (~50 m Torr). The sample was then transferred to the adsorption unit, and the $N_2$ adsorption was measured at the boiling temperature of nitrogen (T=−196° C.).

Powder x-ray diffraction (XRD) measurements were performed on all spent catalyst materials. The catalyst was washed in heptane before XRD measurements were taken to remove the mineral oil from the solids. The catalyst was subsequently recovered by conventional filtering procedures. The data were collected on a D8 Siemens Bruker diffractometer with a general area detector employing the Bragg-Brentano geometry and the $CuK_\alpha 1$ wavelength. The data were collected in the 20-50° 2θ range with a step increment of 0.01° and the time for each step was 2 seconds.

XPS measurements were performed on all spent catalyst materials and were used to assess the surface species and quantities present on the powder particles. The XPS studies were carried out using a K-Alpha machine (Thermo Scientific, UK) and the Unifit software (Hesse, R., Chasse, T., and Szargan, R., *Analytical and Bioanalytical Chemistry* 375 (7), 856 (2003)) for data analysis, using the instrument specific powder sample holder. The system's base pressure was less than $5\times10^{-9}$ mbar, however the pressure in the analysis chamber during data collection and analysis was $2\times10^{-7}$ mbar due to the use of the low-energy electron flood gun for charge neutralization. A monochromated Al $K_\alpha$ (hv=1486.6 eV) was used as the x-ray source. The instrument is regularly calibrated to the binding energies (BE) of Au, Cu and Ag peaks. The C 1s, O 1s and Al 2p BE are used as internal standards. The Al/C signal ratio (3/2) is almost constant for all samples, ensuring comparability of collected data. All atomic percentages obtained by XPS in this work are converted to weight percentages for comparability sake.

Structural and chemical characterization was performed with a field emission scanning electron microscope (FESEM)—Model LEO DSM 982, LEO. The SEM was operated at an accelerating voltage of 5 kV and the working distance varied from 3 to 8 mm. The powder was placed under the SEM detector as a loosely scattered powder stuck to conducting tape. All particle sizes quoted in this paper are average particle sizes representative of the total sample.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A catalyst support supporting a catalyst for hydrogenating carbon dioxide and thereby forming long chain hydrocarbons, the catalyst support comprising a catalyst support material capable of forming long chain hydrocarbons and an active material capable of catalyzing a reverse water-gas shift reaction associated with the catalyst support material;
   wherein the catalyst support material comprises ceria; and
   wherein the active material comprises iron carbide.

2. A catalyst comprising the catalyst support of claim 1 and a catalyst material immobilized on the catalyst support.

3. A catalyst as claimed in claim 2, wherein the catalyst material comprises one more metals in elemental form or in the form of oxides, hydroxides or carbides, said metals being selected from the group consisting of K, Mn, Pd, Co, Cr, Ni, La, Ce, W, Pt, Cu, Na, Cs and various mixtures thereof.

4. A method for making a catalyst support for use in carbon dioxide hydrogenation reactions and the formation of long chain hydrocarbons comprising the step of:
   associating an active material capable of catalyzing a reverse water-gas shift reaction with a catalyst support material capable of forming long chain hydrocarbons;
   wherein the catalyst support material comprises ceria; and
   wherein the active material comprises iron carbide.

5. A method as claimed in claim 4, further comprising the step of calcining the associated active material and the catalyst support material.

6. A method as claimed in claim 5, wherein said calcining step is carried out at a temperature of from about 300 to about 1300° C.

7. A method as claimed in claim 4, further comprising the step of:
   depositing a catalyst material onto the associated active and catalyst support materials to form a catalyst.

8. A method as claimed in claim 7, wherein the catalyst material comprises one more metals in elemental form or in the form of oxides, hydroxides or carbides, said metals being selected from the group consisting of K, Mn, Pd, Co, Cr, Ni, La, Ce, W, Pt, Cu, Na, Cs and mixtures thereof.

9. A method as claimed in claim 8, further comprising the step of calcining the associated active and catalyst support materials prior to said depositing step.

10. A method for hydrogenation of carbon dioxides and thereby formation of long chain hydrocarbons comprising the step of reacting hydrogen and carbon dioxide in the presence of a catalyst comprising a catalyst support material, an active material capable of catalyzing a reverse water-gas shift reaction associated with the catalyst support material and a catalyst material for catalysis of a hydrogenation reaction located on the catalyst support material wherein the catalyst support material comprises ceria and wherein the active material comprises iron in elemental, oxide, hydroxide or carbide form and forming long chain hydrocarbons.

11. A method as claimed in claim 10, wherein the catalyst support material further comprises one selected from the group consisting of alumina, magnesia, silica, titania, zirconia, sulfated $ZrO_2$, $WO_3ZrO_2$, $AlF_3$, fluorided $Al_2O_3$, bentonites, zeolites, and $SiO_2/Al_2O_3$, carbon-based supports, molecular sieves, and combinations thereof and the active material is selected from the group consisting of one or more oxides of La, Ce, Pr, Nd, Pm, Sm, Eu, Gd, Tb, Dy, Ho, Er, Tm, Yb and Lu.

12. A method as claimed in claim 11, wherein the catalyst material comprises one more metals in elemental form or in the form of oxides, hydroxides or carbides, said metals being selected from the group consisting of Fe, K, Mn, Pd, Co, Cr, Ni, La, Ce, W, Pt, Cu, Na, Cs and mixtures thereof.

* * * * *